(12) United States Patent
Raubacher et al.

(10) Patent No.: US 7,542,049 B2
(45) Date of Patent: Jun. 2, 2009

(54) HARDWARE ACCELERATED ANTI-ALIASED PRIMITIVES USING ALPHA GRADIENTS

(75) Inventors: Christopher Raubacher, Seattle, WA (US); Gregory D. Swedberg, Bellevue, WA (US); Ashraf A. Michail, Redmond, WA (US); Michael Kallay, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 353 days.

(21) Appl. No.: 11/377,035

(22) Filed: Mar. 16, 2006

(65) Prior Publication Data

US 2006/0214946 A1 Sep. 28, 2006

Related U.S. Application Data

(63) Continuation of application No. 10/341,168, filed on Jan. 13, 2003, now Pat. No. 7,050,067.

(51) Int. Cl.
*G09G 5/00* (2006.01)
*G06T 15/50* (2006.01)

(52) U.S. Cl. ............... 345/611; 345/426; 345/423; 345/606; 345/670

(58) Field of Classification Search ............. 345/418, 345/423, 426, 582, 606, 609, 611
See application file for complete search history.

(56) References Cited

U.S. PATENT DOCUMENTS 5,861,891 A 1/1999 Becker ............... 345/619
6,057,850 A 5/2000 Kichury ............... 345/584
6,071,193 A 6/2000 Suzuoki ............... 463/31
6,292,193 B1 * 9/2001 Perry et al. ........... 345/582
6,366,290 B1 4/2002 Dye et al. ........... 345/582
6,480,201 B1 11/2002 Fushiki et al. ........... 345/592
6,529,207 B1 3/2003 Landau et al. ........... 345/619
2004/0233210 A1 * 11/2004 Hancock et al. ........... 345/582

OTHER PUBLICATIONS

Bala, K. et al., "Combining Edges and Points for Interactive Anti-Aliased Rendering", *Program of Computer Graphics Technical Report: PCG-02-3*, Jan. 2003, 1-11.
Jouppi, N.P. et al., "Z3: An Economical Hardware Technique for High-Quality Antialiasing and Transparency", *Eurographics/SIGGRAPH Workshop on Graphics Hardware*, Aug. 1999, 85-93.
Pighin, F. et al., "Progressive Previewing of Ray-Traced Images Using Image-Plane Discontinuity Meshing", *Proceedings of the 8th Eurographics Workshop on Rendering*, Jun. 16-18, 1997, 115-124.

* cited by examiner

*Primary Examiner*—Chante Harrison
(74) *Attorney, Agent, or Firm*—Woodcock Washburn LLP (57) ABSTRACT

Systems and methods are provided for providing anti-aliasing by introducing a falloff area around a graphics object to be rendered. The falloff area is shaded, using Gouraud shading or texture mapping to reduce the aliasing effects of the graphics object. The outside edge of the falloff area is set to be fully transparent, and the inside edge to an opacity matching the outer edge of the graphics object being rendered. To counteract bloating effects, the graphics object is shrunk by half the width of the falloff area. While the width of the falloff area may vary, generally, the width of the falloff area stays constant. In one embodiment, this width corresponds to the edge or diagonal of the square area mapped to each pixel.

17 Claims, 7 Drawing Sheets

HARDWARE ACCELERATED ANTI-ALIASED PRIMITIVES USING ALPHA GRADIENTS

CROSS-REFERENCE TO RELATED CASES

This application is a continuation of U.S. patent application Ser. No. 10/341,168, filed on Jan. 13, 2003, (MSFT-1439) entitled "Hardware Accelerated Anti-Aliased Primitives Using Alphas Gradients."

FIELD OF THE INVENTION

The present invention is directed to systems and methods for rendering images at a very high image quality. More particularly, the present invention relates to systems and methods for the anti-aliasing of graphics.

BACKGROUND OF THE INVENTION

Conventionally, a complex object that is to be rendered for display may be translated into a triangle mesh made up of one or more triangles that approximate the complex object. Information regarding these triangles, including vertex information, texture mapping information, and color and transparency information, is then passed to the graphics card, where a graphics processor processes the information for display.

In order to display the object using the pixels on a computer screen or other display device, the object is mapped onto a grid of pixels. Each pixel is mapped to a square area of the object. Using this mapping, one of a number of conventional techniques can be used to calculate a set of pixel values for each pixel. These pixel values include, conventionally, three color values (red, green, blue) and a transparency value. Conventionally, the pixel values for a pixel are determined by evaluating a function of the object at a point that corresponds to the center of the pixel.

Often, during rendering, the edges of a shape as rendered will exhibit jaggedness even though the edge was intended to be smooth. Such unwanted effects, known as aliasing effects, are notoriously obvious to the human eye. In order to reduce such effects, anti-aliasing is performed. Anti-aliasing techniques reduce aliasing effects, and thereby produce graphics superior to those produced without the use of such anti-aliasing techniques.

In order to satisfy performance requirements, anti-aliasing must take place in the graphics-optimized environment of the graphics card. High-quality graphics rendering systems may include anti-aliasing techniques, but because of the memory and processor requirements, on some general-purpose graphics cards, full-scene anti-aliasing techniques are not included. Where it is included, the full-scene anti-aliasing techniques are resource intensive, and in some cases do not provide quality rendering. Some graphics cards do include other anti-aliasing techniques, such as anti-aliasing of edges; however, support for such techniques is not broad, and the developer of an application cannot rely on such support. Even where full-scene anti-aliasing is included on a graphics card, the memory requirements on the card are large and the performance does not support demanding real-time graphics.

Thus, there is a need to implement anti-aliasing of graphics objects for real-time graphics without requiring new functionality beyond that currently present in most graphics cards, without requiring large increases in processing or memory usage in the graphics card, and without relying on techniques which are not widely supported in existing graphics cards.

SUMMARY OF THE INVENTION

In view of the foregoing, the present invention provides systems and methods for providing anti-aliasing using facilities currently widely supported in graphics cards. In accordance with the invention, a falloff area is created around each graphics object to be rendered. This falloff area is a border around the graphics object being rendered which extends out from the graphics object being rendered for approximately a given width w. In a preferred embodiment, the falloff area is tessellated into a triangle mesh.

Thus, using available graphics card capabilities, improved anti-aliasing is presented without causing a significant decrease in performance time or memory usage.

The invention may be applied to a variety of image processing applications wherein anti-aliasing is required and a method is needed that can work across platforms, e.g. 3-D applications such as game applications.

Other features and embodiments of the present invention are described below.

BRIEF DESCRIPTION OF THE DRAWINGS

The system and methods for providing anti-aliasing in accordance with the present invention are further described with reference to the accompanying drawings in which.

DETAILED DESCRIPTION OF ILLUSTRATIVE EMBODIMENTS

Overview

The invention thus provides methods and systems for performing anti-aliasing using techniques widely supported by graphics cards. A falloff area of width w is created around the object to be rendered. In one embodiment, the falloff area is tessellated and the brush assigns the same color each vertex of the triangles that make up the falloff area, but the transparency assigned to the vertices depends on their position. The transparency of a vertex is proportional to the distance from the vertex to the object being rendered such that the vertices interior to the falloff area are assigned the opacity of the object, and the exterior vertices are assigned full transparency.

In another embodiment, the brush assigns a texture map that defines color and transparency falloff for the falloff area. This texture may be specifically created to mimic a Gaussian filter.

Either Gouraud shading or a falloff texture map may be used in combination with other texture mapping so that anti-aliased shapes requiring arbitrary texture mapping may be rendered. In one embodiment, Gouraud shading is used to render the triangles in the falloff area The outer vertices of the triangles in the falloff area are set to be fully transparent. The inner vertices of the triangles in the falloff area are set to the opacity of the graphics object being rendered. In this way, the falloff area is shaded from transparency at the outside of the falloff area to the opacity of the graphics object in the falloff area locations adjacent to the graphics object. Gouraud shading is widely supported in graphics cards and any increased load on the graphics card will not affect real-time performance.

In another embodiment, texture filtering is used to texture the triangles in the falloff area. Since the width w of the falloff region is known, a texture can be defined which controls the gradual falloff of transparency over the falloff region. In a preferred embodiment, this texture approximates Gaussian filtering. Bilinear texture filtering, which is widely supported in graphics cards, can be used to apply this texture, and any increased load on the graphics card will not affect real-time performance.

In a preferred embodiment, the object being drawn is shrunk before rendering. In a preferred embodiment, the object shrinks by an amount equal to half of the falloff area width w. In a preferred embodiment, the width of the falloff area w is equal to one pixel; that is, w is equal to the length of an edge of the area in the graphics object that has been mapped to each pixel. In another embodiment, the falloff area width w is equal to that edge length times $\sqrt{2}$.

Exemplary Computing Device

Figure 1:
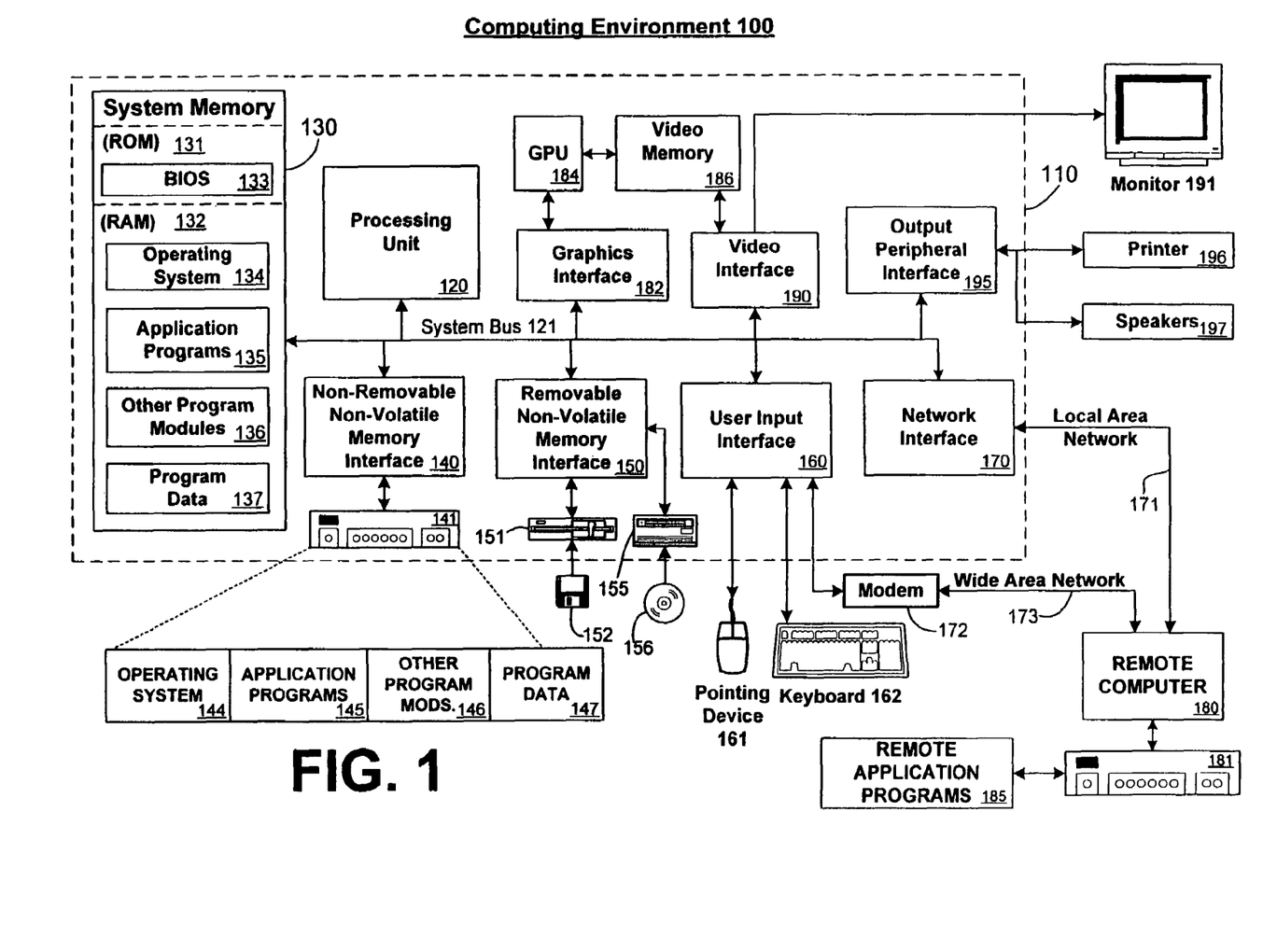
FIG. 1 is a block diagram representing an exemplary non-limiting computing device in which the present invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media Computer readable media can be any available media that can be accessed by computer 110 and includes both volatile and nonvolatile media, removable and non-removable media By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET platform includes servers, building-block services, such as Web-based data storage and downloadable device software. While exemplary embodiments herein are described in connection with software residing on a computing device, one or more portions of the invention may also be implemented via an operating system, application programming interface (API) or a "middle man" object between any of a coprocessor, a display device and requesting object, such that operation according to the invention may be performed by, supported in or accessed via all of .NET's languages and services, and in other distributed computing frameworks as well.

Graphics Processing

Because of the complexity of displaying graphics, specialized subsystems are included in computer systems for handling graphics data. With reference to FIG. 1, a program such as application program 135 communicates over system bus 121 with the GPU 184 through graphics interface 182. The GPU places data into video memory 186, where it communicated for display on a monitor 191. For some data to be displayed, pixel data is included and stored in the video interface with little processing necessary. For example, the display of a bitmapped image may not require complicated graphics processing. However, some applications, for example, gaming applications, create new shapes and views in real-time. Instead of pixel data, the GPU 184 receives vertex data from such applications. The vertex data includes location, color, and transparency data for graphics primitives. This "wireframe" model is transformed by the GPU 184 into geometric data. For example, a triangulation set which translates a complex object to be rendered into a triangle mesh may be calculated using hardware accelerated pipelines.

Once geometric data (or pixel data) has been developed, the data is rendered to a grid for display. The data is converted into fragments, each of which corresponds to a pixel. Vertices are connected into lines, interior pixels are calculated for geometric primitives. Color and depth values are assigned for each fragment. The processed fragment is then drawn into the appropriate buffer in video memory 186, where it will be sent for display to monitor 191.

Figure 2:
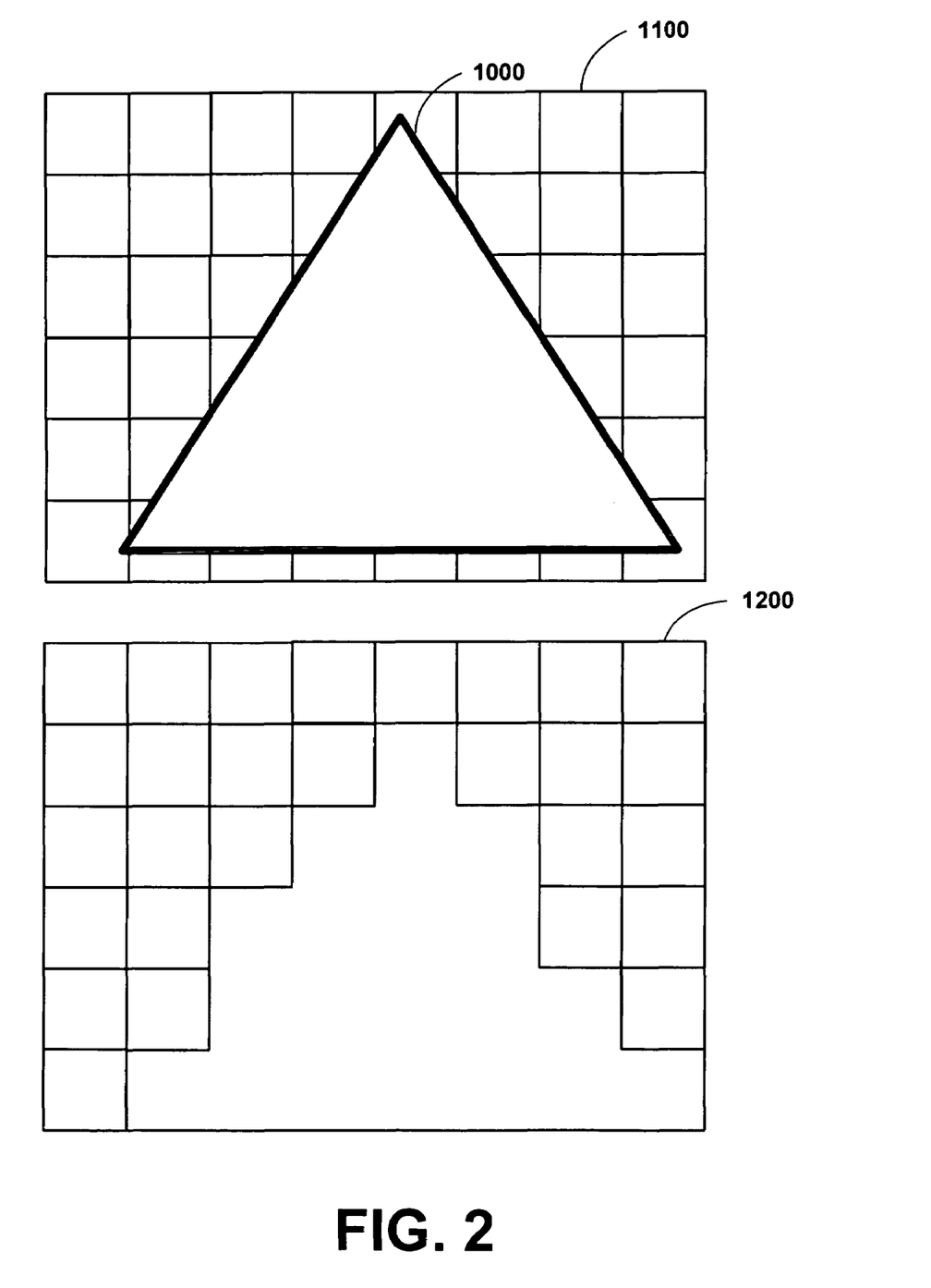
FIG. 2 illustrates rendering a primitive to a grid of pixels.

For example, in FIG. 2, a shape 1000 is to be rendered (in black) to a grid of pixels 1100. The graphics processor will receive the location of the vertices of shape 1000 and color information for those vertices. As can be seen in FIG. 2, the edge of shape 1000 passes through the middle of several pixels. Only one color value can be displayed by any one pixel. Therefore, according to one conventional technique, the color of each pixel (black or white) in the grid of pixels is determined by evaluating whether the center point of the pixel is inside of the shape 1000 being rendered. If it lies inside the shape 1000, then the pixel is colored black. If it lies outside the shape, the pixel is transparent. The resulting grid of pixels 1200 displays aliasing effects—instead of the smooth edges and bilateral symmetry that the shape was intended to have, the resultant shape has jagged and non-symmetric edges.

In order to prevent aliasing, several anti-aliasing techniques have been developed. One conventional anti-aliasing technique is full scene anti-aliasing. In full scene anti-aliasing, the entire scene being rendered is rendered onto a grid of cells. The grid contains more cells than the actual pixel grid has pixels. For example, one conventional anti-aliasing technique is 4×4 multi-sampling, in which sixteen cells in the grid of cells represent each pixel. The center of each cell is examined to determine whether the center lies inside or outside of the shape being rendered. After the entire scene is rendered, the data regarding each of the cells representing the pixel are combined to determine the values for the pixel. This technique requires a large amount of processing power and memory on the graphics card, generally on the order of sixteen times as much processing and memory for 4×4 anti-aliasing, and possibly more, depending on which card is being used.

A related anti-aliasing technique is super-sampling, a variation on multi-sampling in which the combination of cells representing a pixel gives more weight to cells sampled for a given pixel when those cells are closer to the center of the pixel, and less weight to those further away from the center of the pixel.

Another conventional anti-aliasing technique is weighted pixel sampling. Weighted pixel sampling combines a number of sample values to yield a value for the pixel. Samples for a given pixel may even be taken outside of the area mapped to that pixel. The sample values are given weights to determine the amount of influence each sample value will have on the final result for the pixel. In one conventional implementation, in determining pixel values for a pixel, more influence is given to samples that are closer to the center of that pixel. According to a conventional technique, using a Gaussian function for weighted sampling on a sample area of radius 0.75 pixels around the center of a pixel yields good results.

Anti-Aliasing Using a Falloff Area

Figure 3:
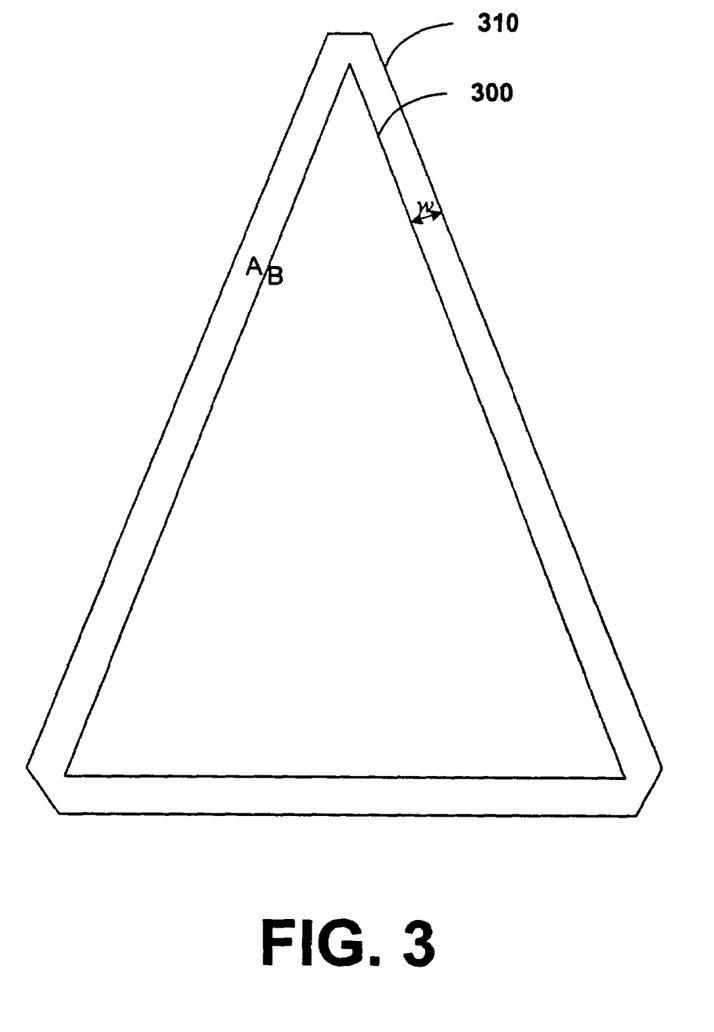
FIG. 3 illustrates the falloff area added to a graphics object according to the invention.

According to a preferred embodiment of the invention, as seen in FIG. 3, a falloff area 310 is drawn around the graphics object 300 to be rendered. In a preferred embodiment of the invention, the falloff area 310 generally has a constant width w, as shown. As shown, however, the shape of falloff area 310 may be chosen so that it is easily tessellated into a triangle mesh or other tessellation primitives, therefore the width of the falloff area may not be constant over the entire falloff area.

Associated with falloff area 310 is data to be used in rendering falloff area 310, which defines a falloff in opacity in falloff area 310. The falloff in opacity corresponds to decreasing proximity from the graphics object. In a preferred embodiment, the opacity of the inside edge of the falloff area 310 matches the opacity on the outer edge of the graphics object 300. This opacity shades off gradually, and the outside edge of the falloff area is transparent.

In other words, the opacity in a region of falloff area 310 adjacent to the graphics object 300 (e.g. the region in which the letter A appears) should be substantially equal to the opacity of the region of graphics object 300 (e.g. the region in which the letter B appears) that is adjacent to that falloff region. If the graphics object 300 is fully opaque, then the areas of the fall off area 310 substantially near to the graphics object 300 should also be fully opaque. If the graphics object 300 has opacity p, then the region of the falloff area 310 substantially near to the graphics object 300 should also have opacity p. The regions of the falloff area 310 which are farther from the graphics object 300 should be more transparent.

The shading of the falloff area is done by using techniques supported in the graphics card, such as Gouraud shading and texture mapping. Other widely-supported techniques in graphics cards may also be used. According to one embodiment of the invention, the falloff area is added and vertex and other falloff area information is then passed to a graphics processing unit 184 (in FIG. 1) which renders the graphic object and the falloff area onto a display such as monitor 191.

The value for w, the width of the falloff area, in a preferred embodiment, is done by reference to the mapping of the graphic object to the pixels of the display. Conventionally, when the graphic object is mapped to a pixel, the area of the graphics object that will be represented by a pixel will be a square. In a preferred embodiment, w is equal to a side of this square. In another embodiment, w is equal to the diagonal of the square (or $\sqrt{2}$ times the length of one side of the square.)

Figure 4:
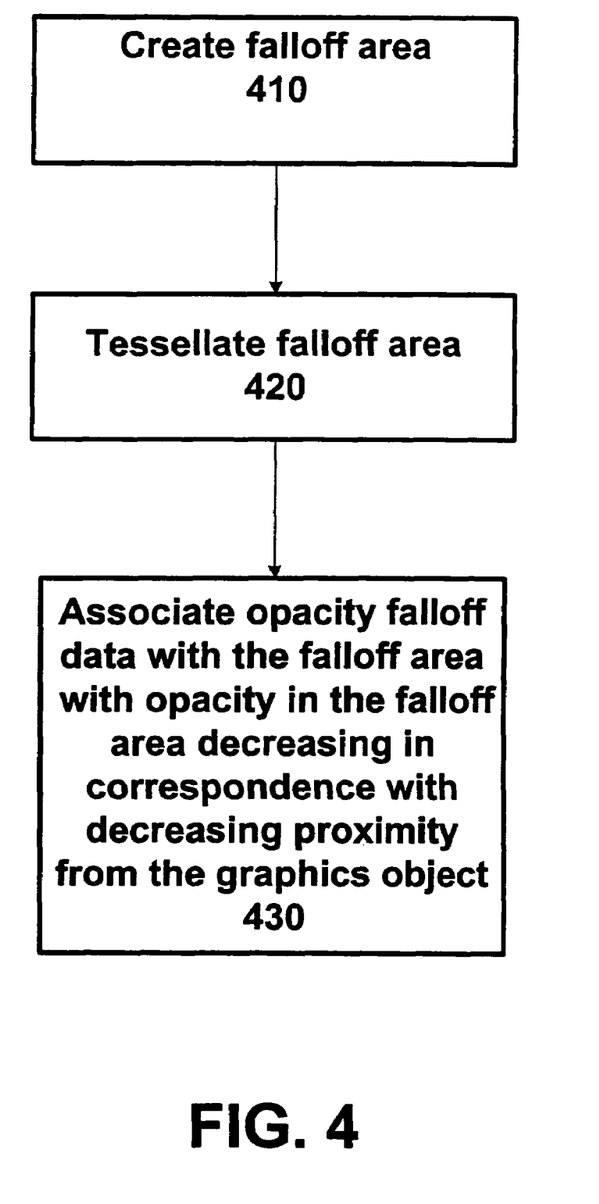
FIG. 4 is a flow diagram of the anti-aliasing technique according to the invention.

Thus, as shown in FIG. 4, in order to reduce aliasing effects, a falloff area is created around the graphics object, 410. The falloff area is tessellated, 420. Opacity falloff data is associated with the falloff area primitives such that the vertex data and opacity falloff data define a falloff area around the graphics object, with opacity falloff data assigned so that the graphics area, when rendered, has a falloff in opacity from the opacity of the graphics object (at the edge of the object) to zero (at the outside of the falloff area) 430. Two methods of performing this step 430 are Gourad shading and texture mapping, as described below. In one embodiment, the anti-aliasing according to this invention is performed by the application generating the graphics objects being anti-aliased. Other embodiments, in which the anti-aliasing is performed by a separate pre-rendering application are also contemplated.

Gouraud Shading in the Falloff Area

The desired falloff in opacity may be created using Gouraud shading ("intensity interpolation shading"). Gouraud shading is a technique for shading a graphics object.

When Gouraud shading is applied to a polygon, each vertex of the polygon is assigned a color and transparency. If a different color or transparency value is specified for a different vertex, when the polygon is rendered, a smooth interpolation is performed across the surface of the polygon. This technique is conventionally used to allow for smooth variations in color of complex shapes to allow for more natural shading in an object composed of several graphics primitives.

Figure 5:
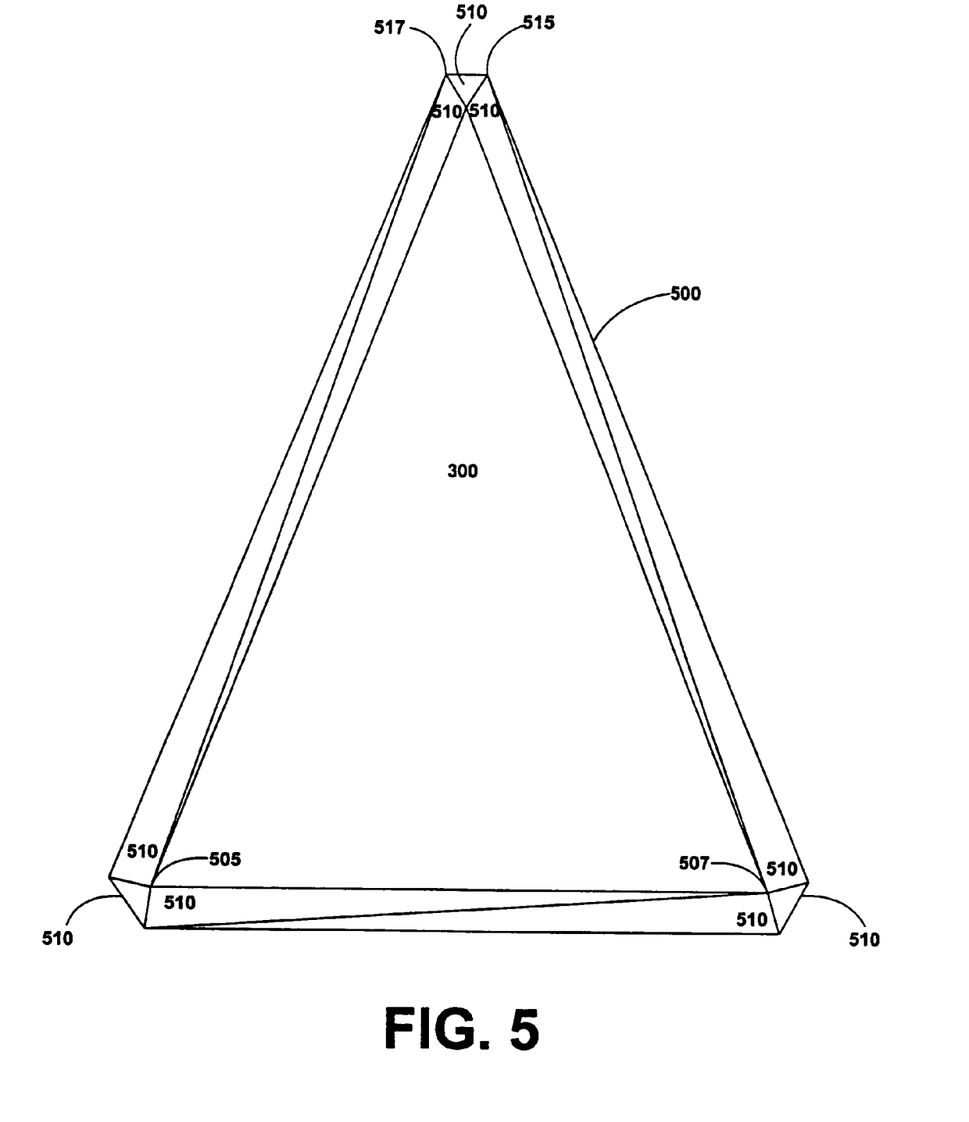
FIG. 5 illustrates the tessellation of the falloff area according to the invention.

As shown in FIG. 5, in order to use Gouraud shading for the falloff area 310, in a preferred embodiment, the falloff area 310 is tessellated into a triangle mesh 500. The triangles 510 making up triangle mesh 500 will be sent to the graphics card to be rendered. In order to do this, vertices, with position, color, and transparency (or alpha) values, are sent to the graphics card. The vertices are each assigned the color value of the graphics object 300. Some vertices of the triangle mesh will fall on the graphics object 300. These interior vertices, such as vertices 505 and 507, are given an opacity value equal to that of the opacity of the graphics object 300. Other vertices will fall on the outside of the falloff area 310. These exterior vertices, such as vertices 515 and 517, are given an opacity value equal to full transparency.

Figure 6:
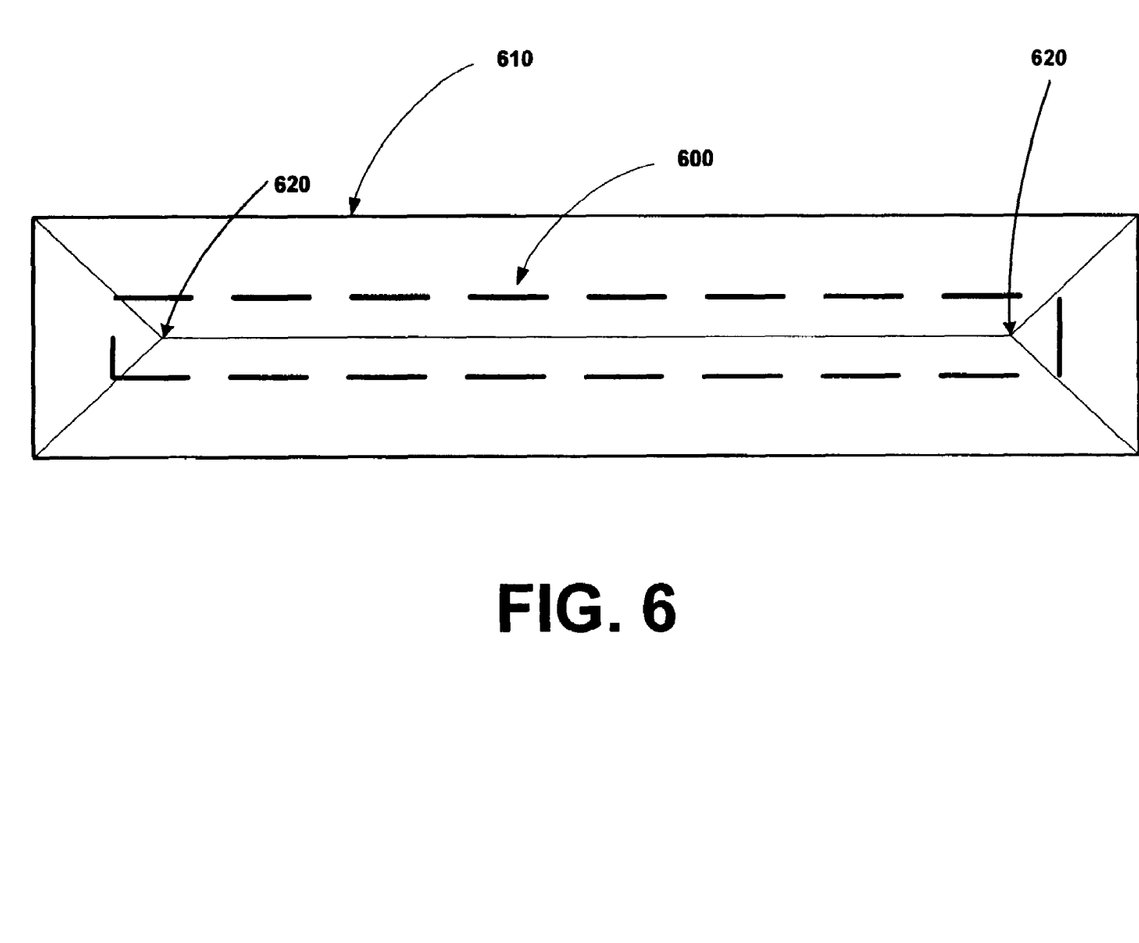
FIG. 6 illustrates the tessellation of another falloff area according to the invention.

In many cases, the vertices produced in tessellating the falloff area 310 into a triangle mesh 500 will all be interior or exterior vertices. However, for more complex graphics objects, the falloff area 310 may be tessellated and vertices may be produced which include vertices which are not interior vertices and are not exterior vertices. In a preferred embodiment, the opacity value for such a vertex is proportional to how close the vertex is to the graphics object. For example, if the graphics object is of opacity p, a vertex which is d distance from the outside of the falloff area will be assigned an opacity of p*(d/w). This may also occur where the graphics object is thinner than one pixel in width. In FIG. 6, object 600 is a rectangle which is thinner than one pixel in width. In such a case, the shape is included in the falloff area 610. The falloff area, when tessellated, includes vertices 620 which are on the interior of the object 600. These vertices will be assigned an opacity proportional to their distance from the exterior boundary of object 600.

Figure 7:
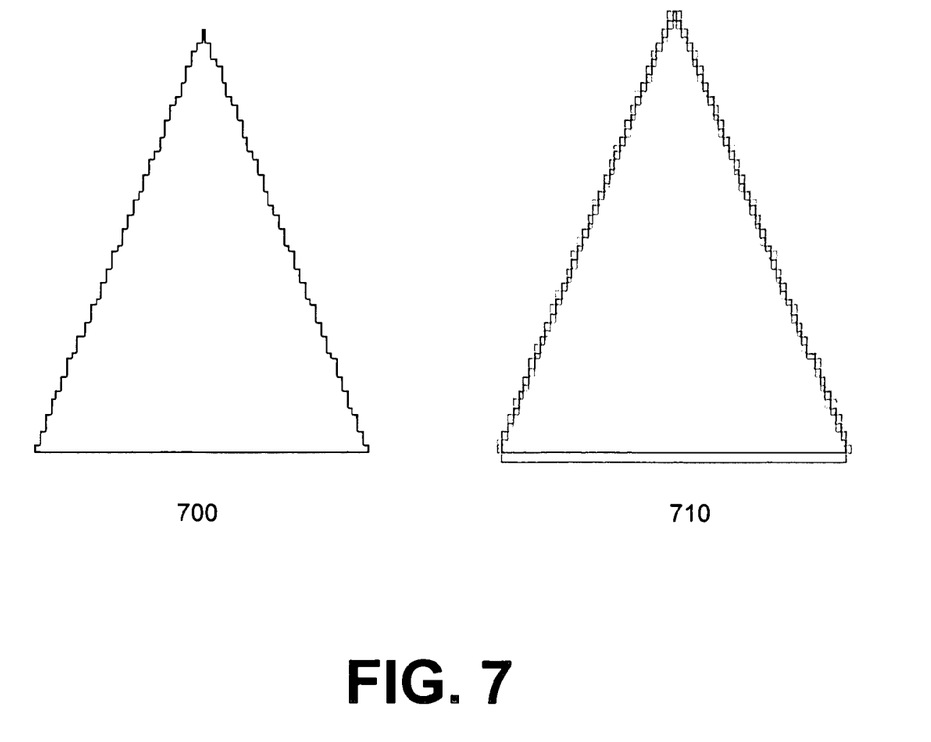
FIG. 7 illustrates the resulting anti-aliasing according to the invention.

When Gouraud shading is performed, then, in the graphics card on the triangle mesh described by these vertex values, the falloff area will exhibit a falloff in opacity corresponding to decreasing proximity from the graphics object. Since Gouraud shading is widely supported in graphics cards and may be accomplished in real-time without noticeable performance degradation, this allows real-time anti-aliasing with standard graphics cards. As shown in FIG. 7, a graphic object that exhibits significant aliasing effects 700 is significantly anti-aliased when the inventive technique is performed, as can be viewed in the resulting graphic object 710.

Texture Filtering of the Falloff Area

The desired falloff in opacity may also be created using texture filtering.

Texture mapping is a technique for adding realism to a computer-generated scene. Texture mapping lays an image (the texture) onto an object in a scene. Because texture mapping is so useful, it is being provided as a standard rendering technique both in graphics software interfaces and in computer graphics hardware.

When mapping a texture onto an object, the color and/or transparency of the object at each pixel is modified by a corresponding color and/or transparency from the texture. The texture is generally stored as a sampled array, so a continuous image must first be reconstructed from the samples. Textures are made up of texels, which are the base unit of a graphic. When a texture is applied to an object, the mapping of texels to pixels need not be one-to-one. To create smooth texture application where the mapping of texels to pixels is not one-to-one, graphics cards support bilinear texture filtering. Bilinear texture filtering averages four adjacent texels and interpolates, creating new texel data.

In order to use texture mapping to shade the falloff area, a texture is created with transparency (alpha) values that vary from one side of the texture map to the other. When applied to the falloff area, then, this will cause a falloff in transparency. On one edge of the texture map, the transparency values for the texels are set to full transparency. On the other, the transparency values are set to equal to the transparency of the graphics object 310.

Transparency values for intermediate texels in the texture map can be determined in any number of ways. In a preferred embodiment, the intermediate transparency values are inversely proportional to the distance from the edge with full transparency. This will create an effect similar to the one created by using Gouraud shading. However, the transparency values for the interior texels may also be determined using a Gaussian curve instead of a straight proportional line. In this way, when the texture map is applied to the falloff area, the anti-aliasing produced will simulate that created through the use of a Gaussian filter. However, this is done using the bilateral texture filtering which is supported widely in graphics cards, and without the performance degradation that the use of a Gaussian filter would entail.

Counteracting Bloating

Because the falloff area adds additional area to the graphic object's original area, an image rendered without any resizing will suffer from a "bloating" effect. This may cause the rendered image to appear bigger than the original graphic object was intended to be, which may be an undesirable consequence of the use of the falloff area In order to counteract this bloating, the original graphic object may be shrunk before the falloff area is added. Where the width of the falloff area is w, according to one embodiment of the invention, the graphic object shrinks by ½ w on all sides.

Where texture mapping is used in the falloff area to approximate different patterns for the falloff in opacity, a different amount of shrinking may be used in order to best counteract the possible bloating effect. For example, if the falloff in a texture map is steep, and transparency falls off steeply at ¼ w in the falloff area, then it may only be necessary to shrink the graphics object by that amount.

Texturing

In order to create sophisticated graphic objects, a texture map may be used on a graphic object in order to add complex color effects. Other texture map applications may be used to add other texture effects. According to one embodiment of the invention, whatever textures are applied to the graphics object to which a falloff area has been added should also be added to the falloff area.

Where Gouraud shading is used, the falloff area may be textured with whatever texture map is being used for the graphic object. Where the texture mapping data is used for controlling the transparency of the falloff area, any textures applied to the graphics object may be applied to the falloff area as well as the falloff texture. This multitexturing is supported by graphics cards and provides the flexibility to render anti-aliased shapes that require arbitrary texture mapping.

CONCLUSION

As mentioned above, while exemplary embodiments of the present invention have been described in connection with various computing devices and network architectures, the underlying concepts may be applied to any computing device or system. Thus, the techniques for providing improved antialiasing in accordance with the present invention may be applied to a variety of applications and devices. For instance, the algorithm(s) of the invention may be applied to the operating system of a computing device, provided as a separate object on the device, as part of another object, as a downloadable object from a server, as a "middle man" between a device or object and the network, as a distributed object, etc. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent forward mapping achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed:

1. A method for reducing aliasing effects for a given graphics object to be rendered, comprising:
   creating by way of a processor a falloff area object comprising a falloff area around said graphics object;
   generating opacity falloff data associated with said falloff area object defining a falloff in opacity in said falloff area, said falloff in opacity corresponding to decreasing proximity from said graphics object, where said opacity falloff data comprises texture mapping data describing a falloff curve; and
   shrinking said given graphics object to be rendered as a function of the average width of the falloff area at each edge.

2. The method of claim 1, where said texture mapping data comprises data which approximates a Gaussian function.

3. The method of claim 1, where said texture mapping data comprises bilinear texture filtering data.

4. The method of claim 1, where the average width of said falloff area object is w, and where said shrinking of said given graphics object comprises shrinking said given graphics object by approximately ½ w at each edge.

5. The method of claim 1, where said given graphics object is to be rendered to a grid of pixels, where each pixel corresponds to a square area of said given graphics object, and where the average width w of said falloff area object is substantially equal to the length of one side of said square area.

6. The method of claim 1, where said given graphics object is to be rendered to a grid of pixels, where each pixel corresponds to a square area of said given graphics object, and where the average width w of said falloff area object is substantially equal to $\sqrt{2}$ times the length of one side of said square area.

7. A computer-readable physical storage medium for reducing aliasing effects for a given graphics object to be rendered, having stored thereon at least one computer-executable module comprising computer executable instructions for performing a method, the method comprising:
   creating a falloff area object comprising a falloff area around said graphics object;
   generating opacity falloff data associated with said falloff area object defining a falloff in opacity in said falloff area, said falloff in opacity corresponding to decreasing proximity from said graphics object, where said opacity falloff data comprises texture mapping data describing a falloff curve; and
   shrinking said given graphics object to be rendered to account for the addition of the falloff area.

8. The computer-readable physical storage medium of claim 7, where said texture mapping data comprises data which approximates a Gaussian function.

9. The computer-readable physical storage medium of claim 7, where said texture mapping data comprises bilinear texture filtering data.

10. The computer-readable physical storage medium of claim 7, where the average width of said falloff area object is w, and where said shrinking of said given graphics object comprises shrinking said given graphics object by approximately ½ w at each edge.

11. The computer-readable physical storage medium of claim 7, where said given graphics object is to be rendered to a grid of pixels, where each pixel corresponds to a square area of said given graphics object, and where the average width w of said falloff area object is substantially equal to the length of one side of said square area.

12. The computer-readable physical storage medium of claim 7, where said given graphics object is to be rendered to a grid of pixels, where each pixel corresponds to a square area of said given graphics object, and where the average width w of said falloff area object is substantially equal to $\sqrt{2}$ times the length of one side of said square area.

13. A computer device for reducing aliasing effects for a given graphics object to be rendered, comprising:

means for creating a falloff area object comprising a falloff area around said graphics object;

means for generating opacity falloff data associated with said falloff area object defining a falloff in opacity in said falloff area, said falloff in opacity corresponding to decreasing proximity from said graphics object, where said opacity falloff data comprises texture mapping data describing a falloff curve; and means for reducing the size of said given graphics object to be rendered based on the fall off area around said graphics object.

14. The computer device of claim 13, where said texture mapping data comprises data which approximates a Gaussian function.

15. The computer device of claim 13, where said texture mapping data comprises bilinear texture filtering data.

16. The computer device of claim 13, where the average width of said falloff area object is w, and where said shrinking of said given graphics object comprises shrinking said given graphics object by approximately ½ w at each edge.

17. The computer device of claim 13, where said given graphics object is to be rendered to a grid of pixels, where each pixel corresponds to a square area of said given graphics object, and where the average width w of said falloff area object is substantially equal to the length of one side of said square area.

* * * * *